United States Patent
Cantu et al.

(10) Patent No.: US 6,355,938 B1
(45) Date of Patent: Mar. 12, 2002

(54) PHOSPHOR SCREEN SCANNING SYSTEMS

(75) Inventors: Gary Cantu, Foster City; Wayne Evans, Campbell; Todd Lewis, Palo Alto, all of CA (US)

(73) Assignee: PhorMax Corporation, Sunnyvale, CA (US)

( * ) Notice: Subject to any disclaimer, the term of this patent is extended or adjusted under 35 U.S.C. 154(b) by 0 days.

(21) Appl. No.: 09/449,018

(22) Filed: Nov. 24, 1999

Related U.S. Application Data

(60) Provisional application No. 60/110,151, filed on Nov. 25, 1998.

(51) Int. Cl.[7] ............................................. G03B 42/02
(52) U.S. Cl. ..................... 250/584; 250/234; 250/235; 250/585
(58) Field of Search .................. 250/234, 235, 250/584, 585

(56) References Cited

U.S. PATENT DOCUMENTS

| | | |
|---|---|---|
| 2,482,813 A | 9/1949 | Urbach |
| 3,175,084 A | 3/1965 | Hersh |
| 3,246,148 A | 4/1966 | Troeyer et al. |
| 3,859,527 A | 1/1975 | Luckey |
| 3,975,637 A | 8/1976 | Ikedo et al. |
| 4,239,968 A | 12/1980 | Kotera et al. |
| 4,276,473 A | 6/1981 | Kato et al. |
| 4,302,671 A | 11/1981 | Kato et al. |
| 4,302,672 A | 11/1981 | Kato et al. |
| 4,307,930 A | 12/1981 | Saito |
| 4,310,886 A | 1/1982 | Kato et al. |
| 4,315,318 A | 2/1982 | Kato et al. |
| 4,346,295 A | 8/1982 | Tanaka et al. |
| 4,439,682 A | 3/1984 | Matsumoto et al. |
| 4,446,487 A | 5/1984 | Horikawa |
| 4,484,073 A | 11/1984 | Ohara et al. |
| 4,500,783 A | 2/1985 | Kato |
| 4,543,479 A | 9/1985 | Kato |
| 4,582,989 A | 4/1986 | Agano |
| 4,631,581 A | 12/1986 | Carlsson |
| 4,681,227 A | 7/1987 | Tamura et al. |
| 4,684,797 A | 8/1987 | Ando et al. |
| 4,692,813 A | 9/1987 | Conrad et al. |
| 4,700,066 A | 10/1987 | Horikawa |
| 4,710,626 A | 12/1987 | Takahashi et al. |
| 4,712,887 A | 12/1987 | Baer |
| 4,758,062 A | 7/1988 | Sunagawa et al. |
| 4,778,995 A | 10/1988 | Kulpinski et al. |

(List continued on next page.)

FOREIGN PATENT DOCUMENTS

| | | | |
|---|---|---|---|
| EP | 0482676 | 4/1992 | |
| EP | 0 345 903 B1 | 4/1993 | |
| EP | 0 345 904 B1 | 4/1993 | |
| EP | 0 533 233 B1 | 7/1995 | |
| EP | 0 667 540 | 1/1997 | |
| EP | 0 814 594 | 12/1997 | |
| EP | 0 905 715 | 3/1999 | |
| JP | 64-6918 | 1/1989 | |
| JP | 1-205148 | 8/1989 | |
| JP | 2-272440 | 7/1990 | |
| JP | 3002746 A | * 1/1991 | ................ 250/585 |
| JP | 3-221940 | 9/1991 | |
| WO | WO 97/28439 | 8/1997 | |
| WO | WO 97/28486 | 8/1997 | |
| WO | WO 98/02780 | 1/1998 | |

*Primary Examiner*—Constantine Hannaher
*Assistant Examiner*—Andrew Israel
(74) *Attorney, Agent, or Firm*—Townsend Townsend & Crew LLP; Mark D. Barrish, Esq.

(57) ABSTRACT

A system for scanning an imaging plate, comprising: a continuous belt drive; a first scanning head mounted to the belt drive; a second scanning head mounted to the belt drive; and a laser positioned to direct a laser beam in a beam path across the imaging plate, wherein the continuous belt drive is positioned to sequentially move each of the first and second scanning heads in a path collinear with the laser beam path when moving across the imaging plate.

33 Claims, 8 Drawing Sheets

U.S. PATENT DOCUMENTS

| | | | |
|---|---|---|---|
| 4,810,874 A | 3/1989 | Torii |
| 4,814,617 A | 3/1989 | Goto |
| 4,816,923 A | 3/1989 | Saotome |
| 4,827,129 A | 5/1989 | Tressl et al. |
| 4,838,632 A | 6/1989 | Manian |
| 4,849,632 A | 7/1989 | Watanabe |
| 4,877,966 A | 10/1989 | Tomei et al. |
| 4,881,812 A | 11/1989 | Ohkubo et al. |
| 4,882,488 A | 11/1989 | Hashiue |
| 4,886,968 A | 12/1989 | Ohnishi et al. |
| 4,889,233 A | 12/1989 | Torii |
| 4,922,102 A | 5/1990 | Katayama |
| 4,930,893 A | 6/1990 | Manian |
| 4,973,134 A | 11/1990 | Finkenzeller et al. |
| 5,001,694 A | 3/1991 | Lee et al. |
| 5,003,570 A | 3/1991 | Whiting |
| 5,051,589 A | 9/1991 | Arakawa |
| 5,056,021 A | 10/1991 | Ausborn |
| 5,060,213 A | 10/1991 | Kamisada |
| 5,065,021 A | 11/1991 | Arakawa |
| 5,065,866 A | 11/1991 | Boutet et al. |
| 5,088,079 A | 2/1992 | Baer |
| 5,090,567 A | 2/1992 | Boutet |
| 5,091,652 A | 2/1992 | Mathies et al. |
| 5,144,135 A | 9/1992 | Hendrix et al. |
| 5,172,419 A | 12/1992 | Manian |
| 5,195,074 A | 3/1993 | Tanoshima et al. |
| 5,196,709 A | 3/1993 | Berndt et al. |
| 5,218,461 A | 6/1993 | Aoyama et al. |
| 5,233,193 A | 8/1993 | Arakawa |
| 5,266,803 A | 11/1993 | Heffelfinger |
| 5,274,240 A | 12/1993 | Mathies et al. |
| 5,278,410 A | 1/1994 | Boutet et al. |
| 5,293,363 A | 3/1994 | Takeshita |
| 5,296,341 A | 3/1994 | Manian |
| 5,310,059 A | 5/1994 | Robertson |
| 5,347,139 A | 9/1994 | Barker et al. |
| 5,365,076 A | 11/1994 | Itakura |
| 5,412,222 A | 5/1995 | Hejazi |
| 5,418,355 A | 5/1995 | Weil |
| 5,424,841 A | 6/1995 | Van Gelder et al. |
| 5,436,718 A | 7/1995 | Fernandes et al. |
| 5,451,895 A | 9/1995 | Lim |
| 5,461,240 A | 10/1995 | Karasawa |
| 5,475,230 A | 12/1995 | Stumpf et al. |
| 5,519,229 A | 5/1996 | Verbeke et al. |
| 5,528,050 A | 6/1996 | Miller et al. |
| 5,542,012 A | 7/1996 | Fernandes et al. |
| 5,565,678 A | 10/1996 | Manian |
| 5,578,818 A | 11/1996 | Kain et al. |
| 5,598,008 A | 1/1997 | Livoni |
| 5,635,728 A | 6/1997 | Cantu et al. |
| 5,646,411 A | 7/1997 | Kain et al. |
| 5,672,880 A | 9/1997 | Kain |
| 5,719,391 A | 2/1998 | Kain |
| 5,754,291 A | 5/1998 | Kain |
| 5,757,021 A | 5/1998 | Dewaele |
| 5,859,441 A | 1/1999 | Muraishi |
| 5,869,839 A | 2/1999 | Wendlandt et al. |
| 6,268,613 B1 * | 7/2001 | Cantu et al. ................ 250/584 |

* cited by examiner

PHOSPHOR SCREEN SCANNING SYSTEMS

CROSS-REFERENCE TO RELATED APPLICATIONS

The present application is a regular application which claims the benefit of U.S. Provisional Patent Application No. 60/110,151 filed Nov. 25, 1998.

TECHNICAL FIELD

The present invention relates to methods and systems for reading images stored on photo-stimulable media, and in particular to reading images stored on phosphor radiation screens.

BACKGROUND OF THE INVENTION

The use of photostimulable phosphor image storage screens as a replacement for an x-ray film and other sensors is well known. Phosphor image screens work by trapping individual x-ray photons in a storage layer. The latent image trapped in the screen can then be read by scanning the storage layer using a suitable wavelength excitation beam, preferably from a focussed laser. The laser excitation beam causes the screen to release the latent image in the form of emitted stimulable phosphor light that is proportional to the x-ray energy applied to the screen during exposure. The emitted light is collected by an optical system and is converted into an electronic signal proportional to the emitted light. The electrical signal is then converted into a digital value and passed to a computer which generates and stores an image file. The image file can then be displayed as a representation of the original radiograph, with image enhancement software applied to augment the radiographic information.

Various known systems for moving a scanning head or directing a scanning beam across image or data storage screens are known. In one family of systems, an X-Y raster scan is taken as follows. The scanning head or beam first scans in a straight line across the screen in an X direction. The screen is then moved a short incremental distance in the Y direction. (Alternatively, the scanning head or the optics directing the beam can be moved incrementally in the Y direction). Thereafter, an X directional scan is repeated. Accordingly, by scanning back and forth in one direction, while intermittently advancing the screen, (or re-directing the scanning beam), in a perpendicular direction, an X-Y raster scan is generated. In a second family of systems, the image or data storage screen is rotated in the plane of the screen about a center point in the screen while a scanning head is moved radially across the screen.

A problem common to both families of scanning systems is the problem of precisely controlling the movement of the scanning head, (or the movement of the optical system directing the scanning beam, which may comprise a galvanometric mirror). This is partially due to the fact that the scanning head or scanning beam optics must be rapidly moved back and forth in at least one direction with the speed of such movement constantly and quickly changing. Accordingly, such scanning heads or scanning beam optical systems which rapidly move back and forth are typically subject to accelerations which cause problems including mechanical wear and failure and reduce read efficiency (i.e.: duty cycle) time to less than 100%. Moreover, problems exist when attempting to accurately position such a moving scanning head or beam direction system to direct an incident beam at a desired location on the phosphor screen.

A second problem common to existing imaging systems is that such systems are configured such that the response radiation emitted by the screen is not directed back to a light detector through the same optical train that was used to direct incident laser light at the screen. Accordingly, a first optical train is required to direct and focus the incident light on the screen, and a second optical train is required to detect and measure the response radiation emitted by the screen.

It would instead be desirable to provide a system for high speed scanning of a phosphor screen, (or any other photo-stimulable media), which moves a scanning beam head in a path across the surface of the phosphor screen to generate a raster scan, yet avoids the problems of controlling the back and forth movement of the scanning head across the screen. It would also be desirable to avoid potential inaccuracies, control and wear and tear problems caused by acceleration forces moving such a scanning head back and forth in one or two directions, at the same time achieving near 100% duty cycle read efficiency.

Moreover, it would be desirable to create a high speed scanning system which has minimal dead time during its operation such that a near continuous data stream can be generated as the phosphor screen is scanned.

Additionally, it would be desirable to create a high speed scanning system which does not require a transport mechanism which either moves the phosphor screen in two perpendicular directions (such as would be accomplished with an X-Y transport mechanism), or rotates the phosphor screen.

Additionally, it would be desirable to create a high speed scanning system which uses the same optical train for phosphor screen stimulation and data collection.

SUMMARY OF THE INVENTION

The present invention provides systems and methods for scanning a photostimulable imaging plate, (which may preferably comprise phosphor storage screen), with a scanning system comprising a continuous belt drive having at least two scanning heads mounted thereon. In one preferred aspect, a dual-head scanning device is provided, but the present invention also encompasses more than two scanning heads being used.

In accordance with the present invention, the two (or more) scanning heads are moved across the surface of a phosphor screen by a rotating belt drive, and are preferably attached to the continuous belt drive at equidistant locations around the belt drive.

A laser is positioned to direct a laser beam in a beam path which passes above, and fully across, the imaging plate. Preferably, the laser beam path is parallel to the surface of the imaging plate, however, the laser beam path can also be angled to the surface of the imaging plate as long as it passes fully across the surface of the imaging plate.

The continuous belt drive is dimensioned and positioned to sequentially move each of the first and second scanning heads across the surface of the imaging plate in a path which is collinear with the laser beam, with only one of the scanning heads being disposed in the laser beam path at a time.

Each scanning head operates to reflect the incident laser beam onto the surface of the imaging plate. In addition, each of the scanning heads directs response radiation emitted by the imaging plate towards a photodetector. The signal output of the photodetector is used to create an image corresponding to the image stored on the phosphor screen.

The present invention also provides methods for scanning an imaging plate, comprising, directing a laser beam in a beam path across the surface of the imaging plate; and alternatingly moving first and second scanning heads across the surface of the imaging plate in a path collinear with the beam path wherein only one of the first and second scanning heads is positioned collinear with the beam path at a time.

Each of the plurality of scanning heads scans one after another in repeating sequence across the surface of the phosphor screen in the path of the laser beam such that only one scanning head is actively scanning over the phosphor screen at a time. Accordingly, two scanning heads are used in conjunction with a single laser light source and a single photodetector.

The present invention operates with only a minimal amount of dead time during which scanning is not performed. Specifically, dead time only occurs when the system is switching between scanning heads, (i.e., when the first scanning head has just completed its scan across the screen and the second scanning head is just about to commence its scan across the screen). As such, dead time will only occur during the interval when the first scanning head has passed beyond the edge of the screen and immediately prior to the second scanning head moving into position above the screen. The data gap which occurs during this dead time can advantageously be used to distinguish between data gathered by the successive scanning heads such that a raster scan image can easily be generated of the phosphor screen.

An advantage of the present invention is that scanning of the phosphor screen is achieved without changing the direction or speed of rotation of the belt which moves the scanning heads across the screen. Having the belt drive travel at a constant speed and direction ensures that the potential for mechanical wear and failure is substantially reduced. Therefore, high speed scanning can be achieved.

The scanning heads are preferably moved across the surface of the phosphor screen imaging plate by a rotating belt which is wrapped around two or more spaced apart pulleys. The scanning heads may be connected directly to the rotating drive belt.

Concurrently with the movement of the scanning heads across the surface of the phosphor screen in an X direction, the phosphor screen is itself preferably advanced in a perpendicular Y direction underneath the rotating scanning device.

In a first aspect of the invention, the scanning device, (comprising the rotating belt drive with scanning heads attached thereto), is held at a fixed position above the phosphor screen while a transport mechanism, which may comprise a series of rollers and guides or a transport mechanism, moves the phosphor screen under the scanning device. In an alternate aspect of the invention, the transport mechanism is mounted to the scanning device to move the scanning device across the surface of the stationary phosphor screen.

The laser beam emitted from the laser is directed in a beam path across the phosphor screen. Each of the scanning heads are moved in a path collinear with the laser beam when crossing the surface of the phosphor screen. Each of the scanning heads comprise an optical system which intercepts the laser beam and reflects and focuses the beam downwardly onto the phosphor screen as the scanning head moves across the phosphor screen.

The system's optical train directs laser light downwardly toward the phosphor screen from the scanning heads, and directs response radiation emitted by the phosphor screen received by the scanning heads towards the light detector which may preferably comprise a photomultiplier tube, but may, for example, also comprise a photodiode.

During operation of the system, the first scanning head passes completely across the phosphor screen in a straight line as the belt is rotated. Further rotation of the belt then causes the first scanning head to move out of the way of the laser beam as the scanning head passes around one of the pulleys. Scanning is therefore discontinued for a brief period of time, followed immediately by the second scanning head moving into the path collinear with the laser beam such that scanning can then be commenced by the second scanning head. As such, each scanning head will scan one after another across the screen with the system switching between scanning heads as the scanning heads sequentially pass one at a time over the screen, with each scanning head sequentially intercepting the laser beam and reflecting and focussing the beam onto the phosphor screen. Accordingly, only one scanning head is actively scanning across the surface of the phosphor screen at a time.

By repeatedly alternating between the first and second scanning heads, (i.e.: by sequentially moving each in turn into and out of a path collinear with the laser beam), each of the two scanning heads is used in sequence such that only one head is actively scanning across the phosphor screen at a time. Accordingly, imaging signals from two different scanning heads are never produced simultaneously. An advantage of this is that it is not necessary to determine from which of the two scanning heads yielded the image data signal.

An advantage of the present invention is that only one centrally-located photomultiplier tube needs to be used to gather image data from each of the two separate scanning heads. By using a single photomultiplier tube with the two scanning heads, an advantage is not having to calibrate the correlation among more than one photomultiplier tube. Moreover, by using only one single photomultiplier tube, (as opposed to a separate light detector for each scanning head), a lower cost system is provided having a greater mean statistical system reliability.

The first and second scanning heads pass over the screen in the same direction, one after another. Accordingly, the present invention provides near continuous scanning of the phosphor screen, (interrupted only by the short period of time during which the scanning heads pass over the edge of the phosphor screen and are moved around a pulley). Therefore, a line raster scan can be made of the phosphor screen, with the image data acquired in a straight line scan direction while alternating between scanning heads.

An additional advantage of the present invention is that response radiation emitted by the phosphor screen is directed back through the same optical system, (i.e., a mirror in each scanning head), as the incident laser beam such that separate optical lenses to scan the laser beam across the phosphor screen and to collect the response radiation emitted by the phosphor screen are not required.

Concurrently with the rotation of the continuous belt drive, (which moves the first and second scanning heads one way in an X direction), the phosphor screen is preferably advanced in a perpendicular Y direction relative to the rotating scanner. As such, a raster scan of the phosphor screen is generated by moving the scanning heads in one direction over the phosphor screen as the scanning device is moved in a perpendicular direction across the surface of the phosphor screen.

Motion in the Y direction can be motion in incremental steps, which requires only a simple decoding algorithm for generating the image. Alternatively, motion in the Y direction can be continuous, producing scan which can also be electronically decoded when generating an image corresponding to the image on the phosphor screen.

In various preferred aspects, the present invention provides an optical system comprised of a collimated laser which directs a laser beam parallel to a portion of the continuous belt drive passing over the phosphor screen. A dichroic mirror is preferably used to separate incident laser light from the collimated response radiation emitted by the phosphor screen such that only the response radiation is directed to a photomultiplier tube. In one aspect, a separate dichroic mirror is mounted onto each scanning head. In an alternate aspect, a single dichroic mirror is used and is positioned at a stationary location adjacent the laser in the path of the laser beam between the laser and the scanning heads. In this alternate aspect, the dichroic mirror is also preferably mounted near the photodetector. A reflecting mirror is located in each scanning head such that incident laser light is directed towards the phosphor screen and the phosphor emitted light is directed back through the same optical path as the incident laser beam. A focussing lens is also located in each scanning head for focussing the collimated laser beam to a point spot of about 50 microns on the phosphor screen.

As stated, an important feature of the present invention is that it is not necessary to alter the direction or speed of movement of the rotating belt as the two scanning heads pass over the phosphor screen. This substantially reduces wear on the system, and provides a system which is balanced and has a slim aerodynamic profile for high speed rotation. Also, it is not necessary to alter the speed of movement of the scanning heads.

In the present system, the only necessary moving parts are a system to rotate the belt about its two pulleys and a system to advance the relative motion of the phosphor screen to the scanner in a direction perpendicular to the rotating belt. By moving the phosphor screen perpendicular to the direction of scanning head movement, high resolution scanning is achieved as the phosphor screen can be advanced in very small increments relative to the path of the scanning head passing thereover. Accordingly, a pixel by pixel resolution of the image can be derived.

Accordingly, an important feature of the present invention is that it is not necessary to repeatedly move scanning heads back and forth across the surface of the phosphor screen. This substantially reduces wear and tear on the system providing a long-life, high-speed device which has substantially fewer moving parts than existing scanner designs. Moreover, the present invention is balanced and has a slim aerodynamic profile for high speed movement.

BEST MODES OF CARRYING OUT THE INVENTION

Figure 1:
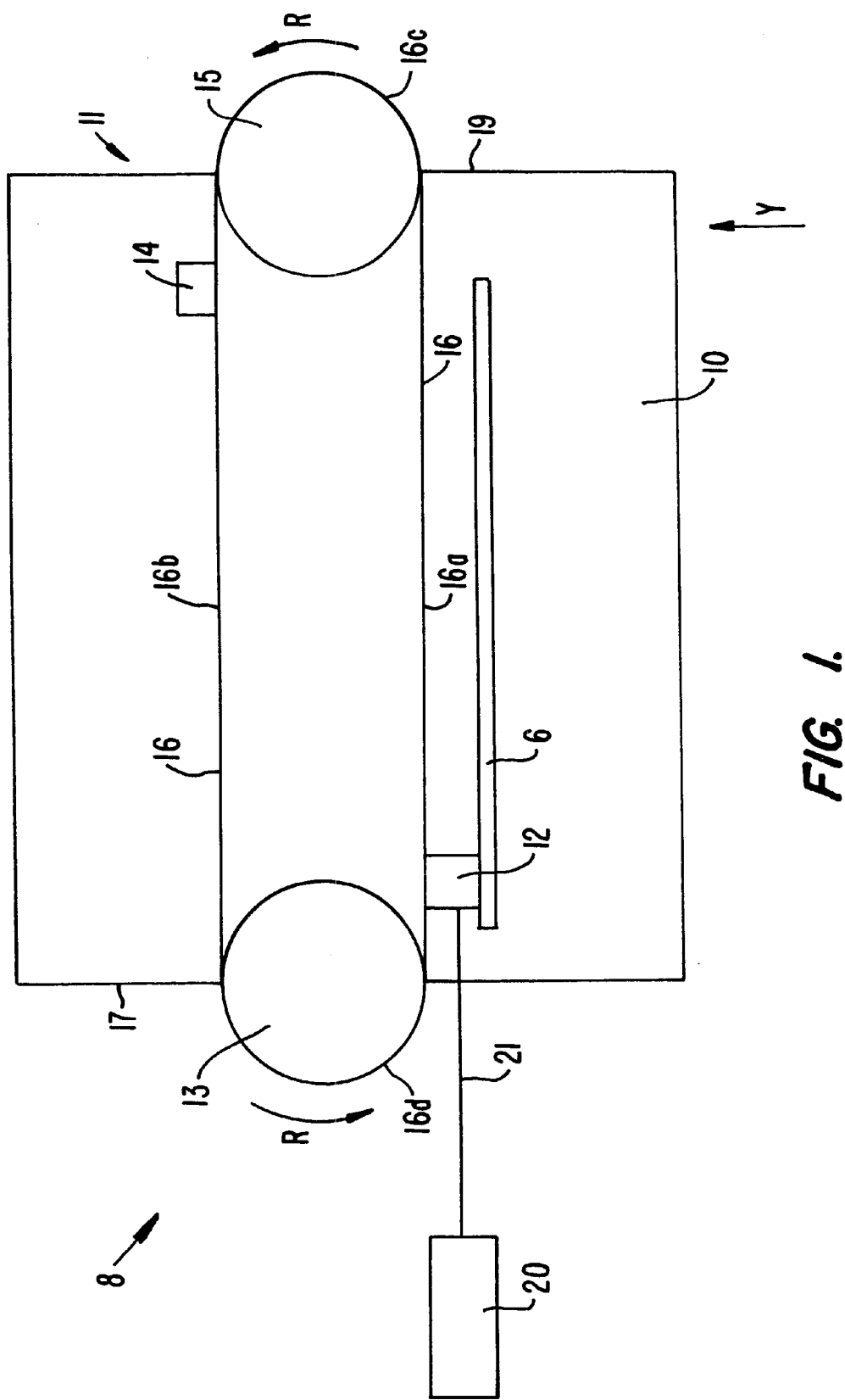
FIG. 1 is a top schematic view of the present invention in a first position over a phosphor screen.

Referring first to FIG. 1, a two-head scanner 8 is provided having scanning heads 12 and 14 and continuous belt drive 16. Scanner 8 is positioned above a phosphor screen 10, as shown. Positioned above phosphor screen 10 are two pulleys 13 and 15 which rotate in direction R as shown. A continuous belt 16 wraps around pulleys 13 and 15. Belt 16 is comprised of parallel sections 16a and 16b spanning between pulleys 13 and 15 and curved sections 16c and 16d wrapped around pulleys 13 and 15, as shown in FIG. 1.

Scanning heads 12 and 14 are mounted to belt 16 at equidistant locations around belt 16, (i.e., such that scanning heads 12 and 14 are mounted as far apart as possible with respect to one another on the continuous belt 16).

Figure 2:
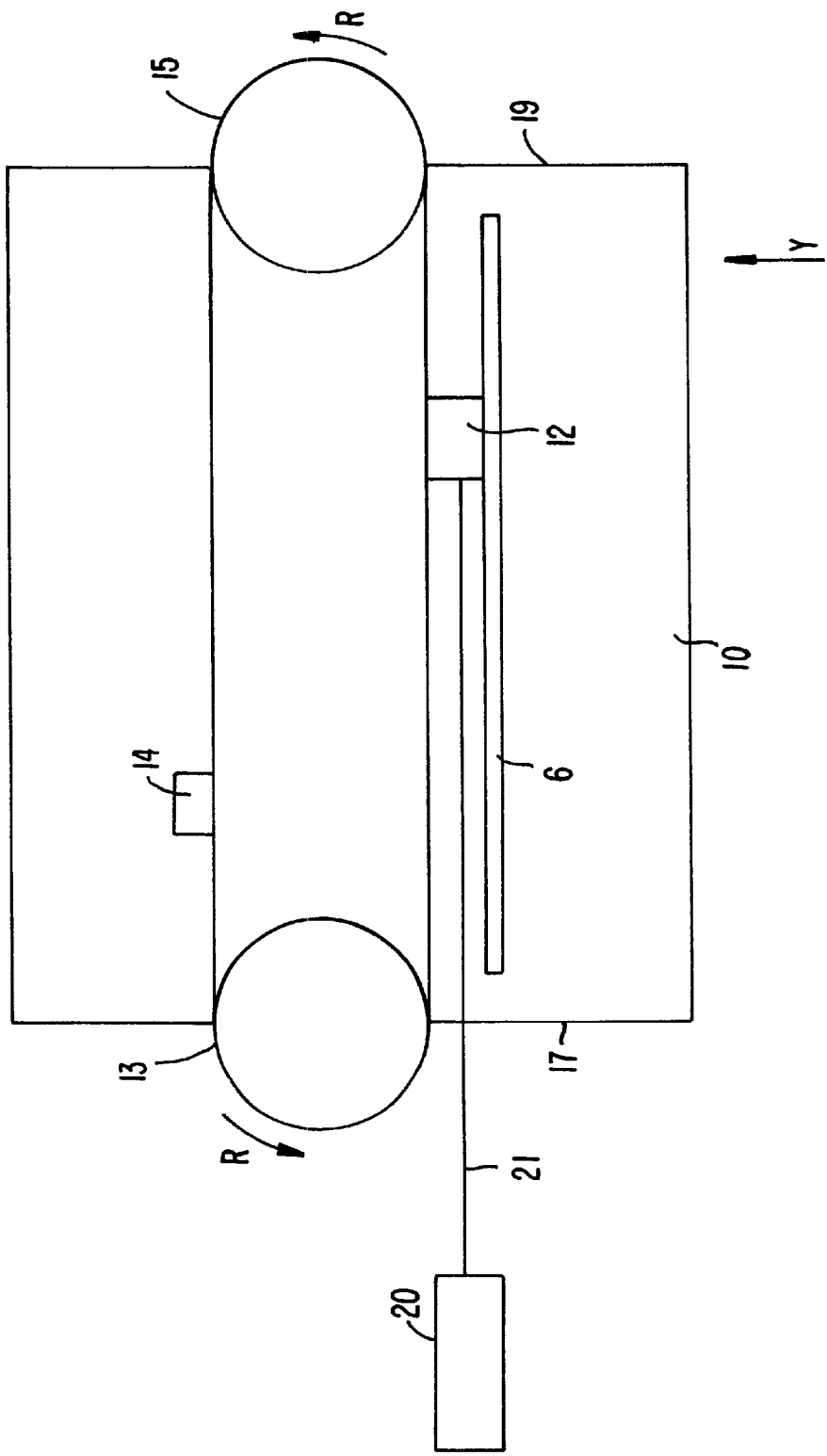
FIG. 2 is a view corresponding to FIG. 1, but with the continuous belt drive rotated such that the two scanning heads are moved to a second position.
Figure 3:
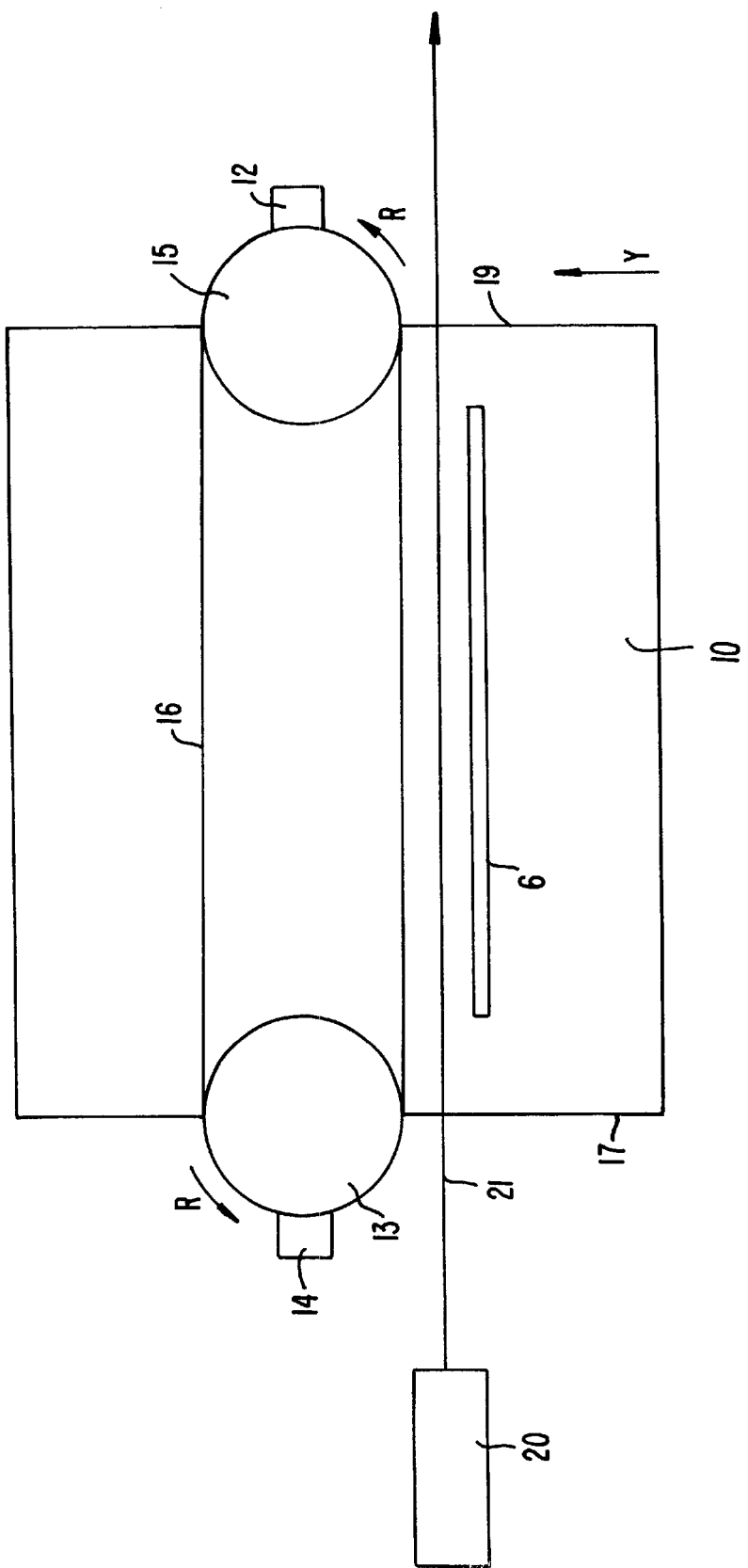
FIG. 3 is a view corresponding to FIG. 1, but with the continuous belt drive rotated such that the two scanning heads are moved to a third position.

FIGS. 1 to 3 illustrate the sequential movement of scanning heads 12 and 14 as belt 16 is rotated, as follows.

A laser 20 directs a beam 21 which, as shown in FIG. 1, is intercepted by scanning head 12 as scanning head 12 travels along a path which is collinear with the path of the incident laser beam 21.

As is seen in FIGS. 2 and 3, (which represent sequential movement of belt 16 about pulleys 13 and 15 as pulleys 13 and 15 are rotated in direction R), scanning head 12 will move in a straight path across phosphor screen 10, (remaining collinear with the path of laser beam 21), thereby providing a linear point scan across the surface of screen 10. As is shown in FIG. 3, rotation of pulleys 13 and 15 will eventually cause scanning head 12 to move out of the path of incident laser beam 21 when scanning head 12 moves around pulley 15. As can be appreciated, further rotation of belt 16 will immediately thereafter cause scanning head 14 to move into the position which was previously occupied by scanning head 12 in FIG. 1. Accordingly, scanning head 14 will then provide a straight line scan across phosphor screen 10, (moving in a path collinear with laser beam 21), similar to the scan provided by scanning head 12 as explained above.

As can be appreciated, each of scanning heads 12 and 14 will thus provide sequential straight line scans moving in the same direction across phosphor screen 10 as belt 16 is rotated. By advancing phosphor screen 10 in perpendicular direction Y, (or by advancing scanner 8 in the Y direction while holding screen 10 at a fixed location), a raster scan of screen 10 is generated.

An important advantage of the present oppositely spaced apart scanning heads 12 and 14 is that near continuous scanning is achieved. Specifically, scanning will cease during the short instance of time during which the scanning heads pass around the circumference of pulleys 13 and 15 and are thus out of alignment with the laser beam. (As is shown in FIG. 3).

Scanning will also cease when the active scanning head has passed beyond the edges of phosphor screen 10. Accordingly, scanner 8 may preferably be dimensioned such that the edges 17 and 19 of phosphor screen 10 are positioned directly under the center of pulleys 13 and 15 as shown. As such, scanning heads 12 and 14 will sequentially scan at all moments in time, except when scanning heads 12 and 14 are moving around pulleys 13 and 15. It is to be understood, however, that scanner 8 could instead be dimensioned such that the distance between the centers of pulleys 13 and 15 is greater than the width of the phosphor screen 10 between its edges 17 and 19. However, such dimensioning would result in a greater amount of dead time (during which one of the scanning heads is intercepting beam 21), but is positioned past either of edges 17 or 19.

Since belt 16 preferably moves at a constant speed, the present two head scanner 8 completely avoids the need to change either the speed or direction of the movement of scanning heads 12 and 14 as they sequentially complete a raster scan of phosphor screen 10.

It is to be understood that the motion of phosphor screen 10 in direction Y can be accomplished either by moving screen 10 while holding pulleys 13 and 15 at a fixed location, or alternatively, by holding screen 10 at a fixed location while moving pulleys 13 and 15 in direction Y.

FIG. 1 also shows a guide rail 6 which is disposed parallel to straight portion 16a of belt 16. Guide rail 6 operates to ensure that scanning heads 12 and 14 remain precisely aligned with the path of laser beam 21 as they travel in a straight path across phosphor screen 11.

A variety of different optical systems may be used in conjunction with the present invention. Examples are shown in FIGS. 4 to 7, but the present invention is not limited thereto.

Figure 4:
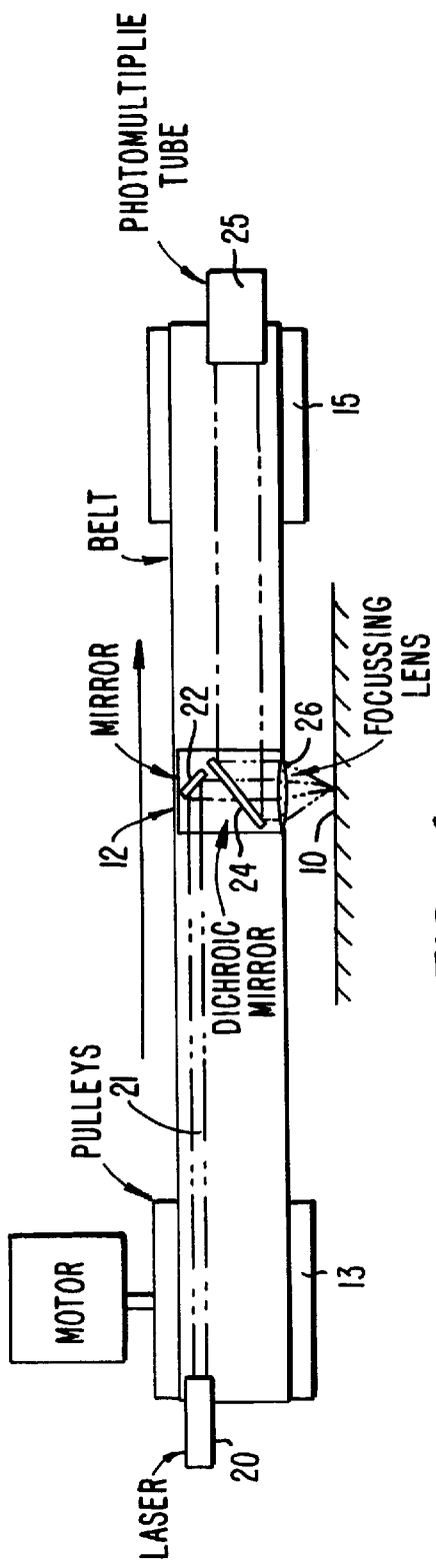
FIG. 4 is a side elevation view of a first optical system, showing two pulleys, a belt and one scanning head.
Figure 5:
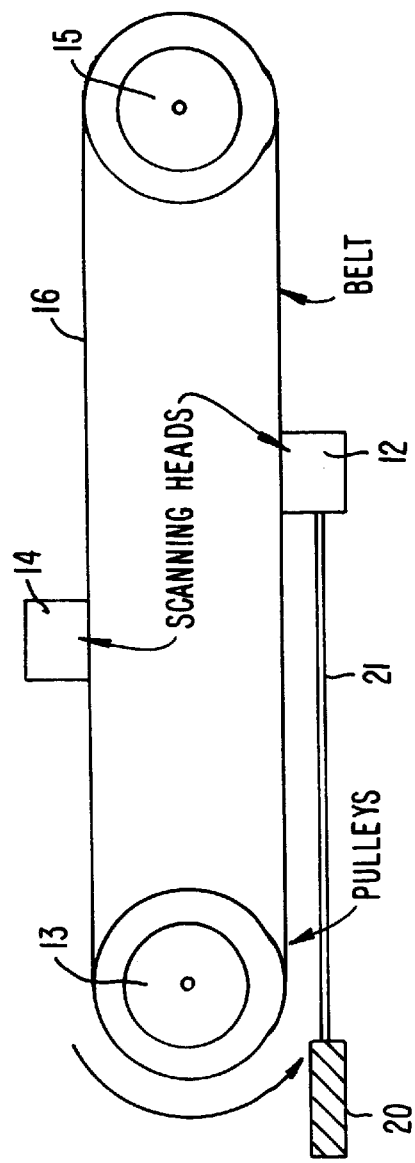
FIG. 5 is a top view corresponding to FIG. 4.

As is shown in FIG. 4, scanning head 12 may comprise a reflective mirror 22 which directs the laser beam through a dichroic mirror 24 and a focusing lens 26 such that the laser beam is focused as a point on the surface of phosphor screen 10. A dichroic mirror 24 can be used to separate response radiation emitted by phosphor screen 10 and divert such response radiation towards photomultiplier tube 25. Photomultiplier tube 25 thus provides a signal which can be used in generating a pixel by pixel image of phosphor screen 10. FIG. 5 shows a top view corresponding to FIG. 4.

Figure 6:
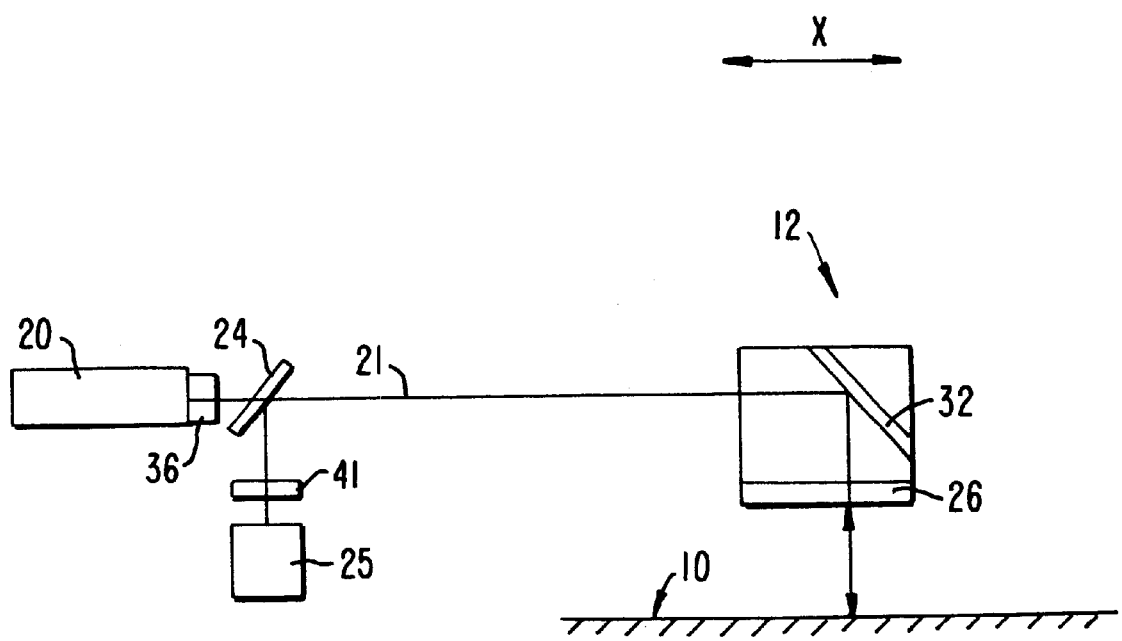
FIG. 6 is a side schematic elevation view of a second optical system.

As is shown in FIG. 6, an alternate optical system positions a stationary dichroic mirror 24 to reflect emission radiation into photomultiplier tube 25. An advantage of this alternate optical system is that separate dichroic mirrors are not placed in each of scanning heads 12 and 14. Rather, by using a single stationary dichroic mirror, (preferably placed adjacent to both laser 20 and photomultiplier tube 25), the weight of the scanning heads 12 and 14 can be minimized.

Figure 7:
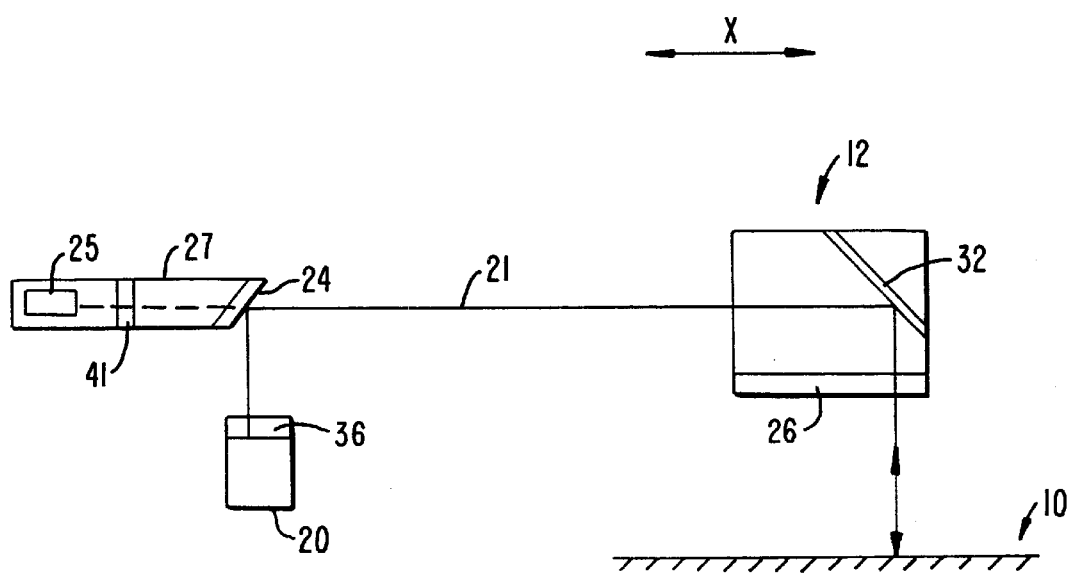
FIG. 7 is a side schematic elevation view of a third optical system.

As is shown in FIG. 7, the positions of laser 20 and photomultiplier tube 25 can be reversed, with a light tight tube 27 preventing stray photons outside the wavelength of interest from entering between dichroic mirror 24 and photomultiplier tube 25.

Rotation of pulleys 13 and 15 can be accomplished by any conventional high speed motor and drive system that produces a constant speed of rotation of belt 16. Alternatively, the speed of rotation of belt 16 can be measured and the data acquisition system can be synchronized to compensate for any minor variations in rotation speed. Translation of phosphor screen 10 in direction Y can be accomplished by attaching phosphor screen 10 to a motorized transport mechanism, such as a series of rollers and guides, or to a translation stage.

Each scanning head 12 or 14 operates to direct a focussed beam of incident laser light towards phosphor screen 10 and to receive response radiation emitted by phosphor screen 10. Using any of a variety of optical trains, response radiation received by the scanning head is separated from the incident laser light and is directed towards a photodetector for gathering image data, as will be explained.

In any of the above preferred optical systems, a filter 41, (or a plurality of filters), which may comprise a red light blocking filter, may be included, and is preferably positioned between scanning head 12 (or 14) and photodetector 25, as shown. Filter 41 will preferably permit blue wavelength emitted response radiation beam 21 to pass therethrough, yet prohibit the passage of reflected or scattered red wavelength incident laser therethrough. Optionally as well, a collimating lens 36 can be positioned adjacent laser 20 for producing a collimated laser beam.

Using any of the various above described embodiments of the optical train, the laser light beam 21 emitted from laser 20 may preferably have a wavelength of about 635 to 680 nM and a power in the range of 0 to 30 mW. The beam of response radiation will typically have a wavelength centered at about 390 nM. Focussing/collimating lens 36 may comprise a 5 to 15 mm diameter lens with a focal length of 4 to 10 mm which will focus the collimated beam of laser light into a beam width of about 25 to 250 microns, and most preferably 30 to 80 microns on the surface of phosphor screen 10. Minimizing the diameter of the incident laser light beam upon the phosphor screen will minimize destructive pre-reading of the image data caused by forward overlap of the focused beam and reflected and scattered laser light. It is to be understood that the foregoing wavelengths, powers and sizes are merely exemplary and that other wavelengths, powers and sizes may also be used.

As stated above, the present invention is not limited to two scanning head designs. For example, FIG. 8 shows a three head scanning system and FIG. 9 shows a four head scanning system.

Figure 8:
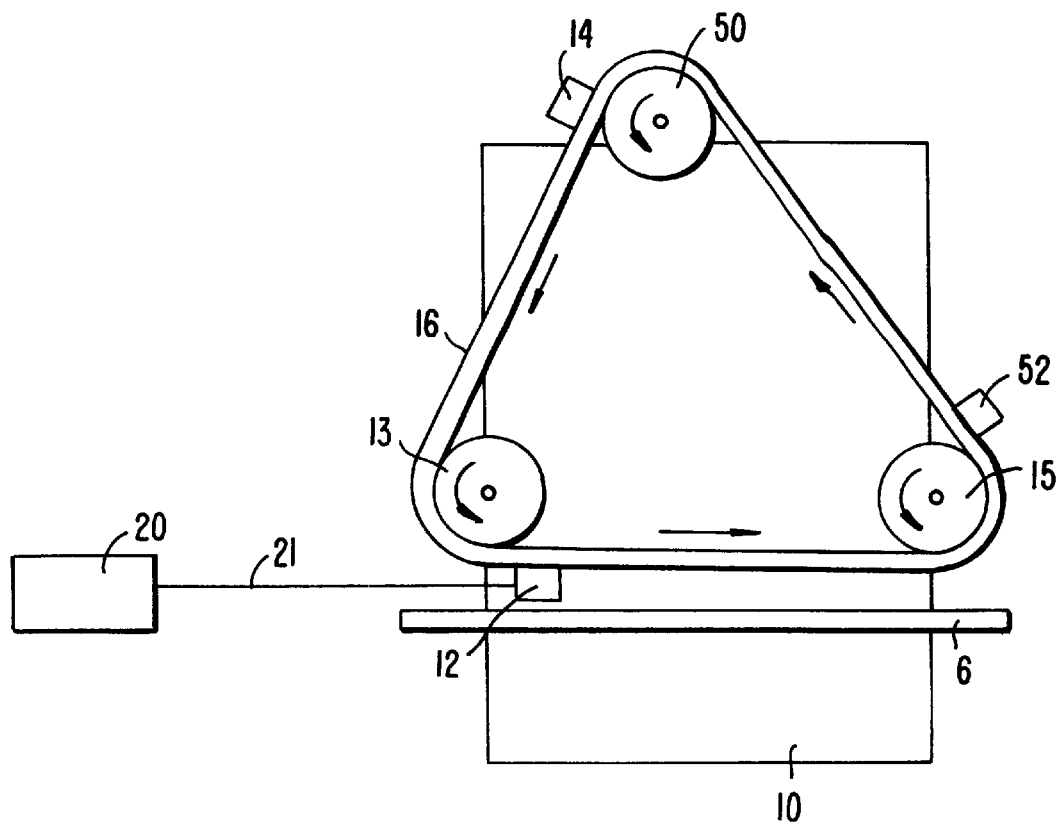
FIG. 8 is a top plan view of a three-head scanning system.

Referring to FIG. 8, belt 16 is wrapped around pulleys 13, 15 and 50. Scanning heads 12, 14 and 52 are mounted equidistantly apart around belt 16. As pulleys 13, 15 and 50 are rotated, each of scanning heads 12, 14 and 50 will sequentially move across the surface of phosphor screen 10, with only one scanning head being disposed to move in a path collinear with laser beam 21, as shown. Specifically, scanning head 12 will move fully across screen 10, followed by scanning head 14 moving fully across screen 10, followed in turn by scanning head 50 moving fully across screen 10.

Figure 9:
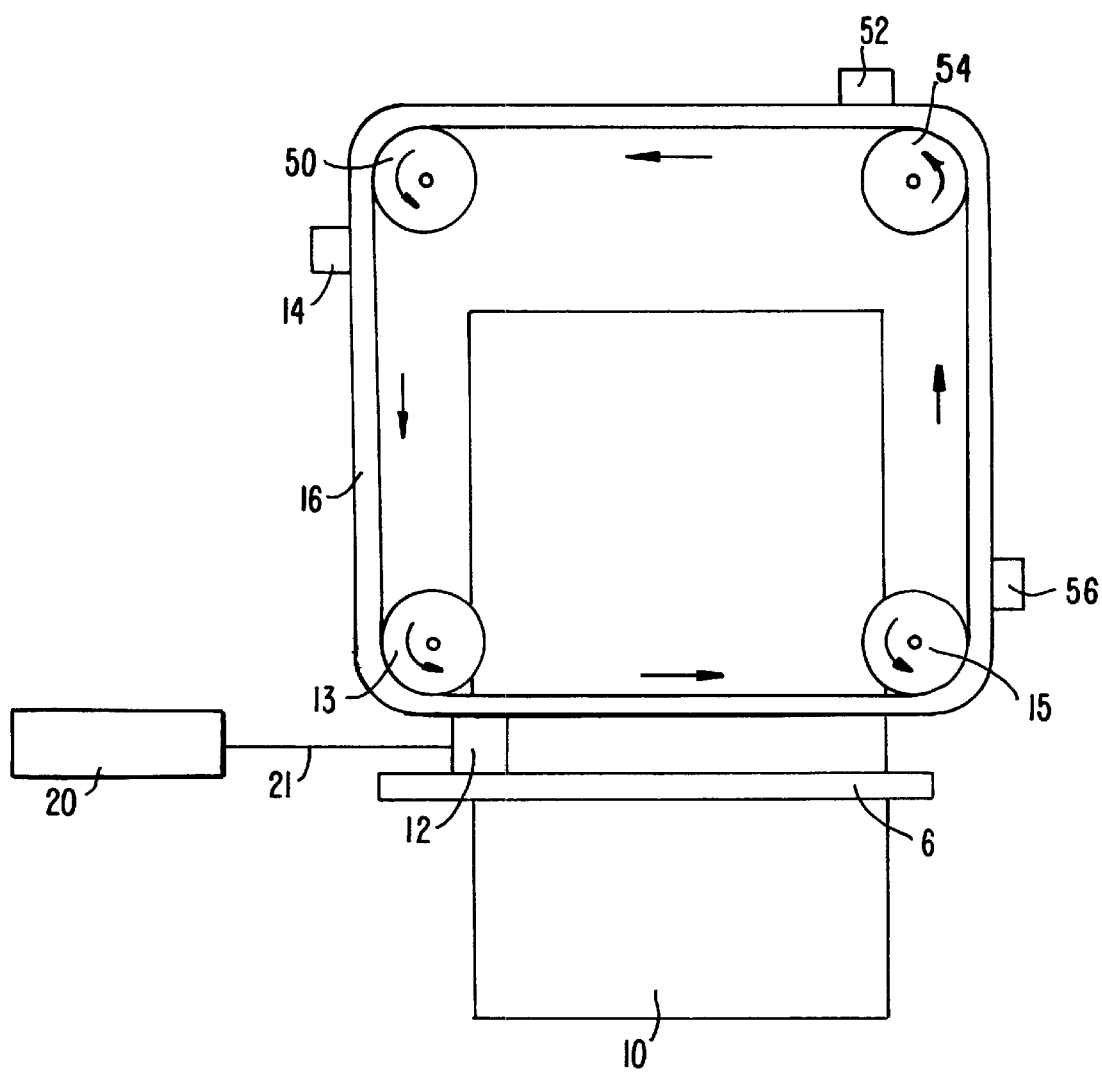
FIG. 9 is a top plan view of a four-head scanning system.

Referring to FIG. 9, belt 16 is wrapped around pulleys 13, 15, 50 and 54. Scanning heads 12, 14, 52 and 56 are mounted equidistantly apart around belt 16. As pulleys 13, 15, 50 and 54 are rotated, each of scanning heads 12, 14, 52 and 56 will sequentially move across the surface of phosphor screen 10, with only one scanning head being disposed to move in a path collinear with laser beam 21, as shown. Specifically, scanning head 12 will scan across screen 10, followed by scanning head 14 scanning across screen 10, followed in turn by scanning head 50 scanning across screen 10, followed in turn by scanning head 56 scanning across screen 10.

What is claimed is:

1. A system for scanning an imaging plate, comprising:
 a continuous belt drive;
 a first scanning head mounted to the belt drive;
 a second scanning head mounted to the belt drive; and
 a laser positioned to direct a laser beam in a beam path across the imaging plate, wherein the continuous belt drive is positioned to sequentially move each of the first and second scanning heads in a path collinear with the laser beam path when moving across the imaging plate.

2. The system of claim 1, wherein the imaging plate is a phosphor screen.

3. The system of claim 1, further comprising:
a pair of pulleys adapted to rotate the continuous belt drive.

4. The system of claim 1, wherein, the first and second scanning heads are mounted equidistantly around the belt drive.

5. The system of claim 4, wherein, the belt drive is dimensioned such that a straight portion of the belt drive spans fully across the imaging plate.

6. The system of claim 5, wherein, only one of the first and second scanning heads is disposed on the straight portion of the belt drive at a time, such that only one of the first and second scanning heads is positioned to move across the surface of the imaging plate in the path collinear with the laser beam path at a time.

7. The system of claim 1, wherein each of the first and second scanning heads comprise:
a mirror for directing a beam of incident laser light emitted from the laser towards the imaging plate.

8. The system of claim 1, wherein each of the first and second scanning heads comprise:
a dichroic mirror for separating incident laser light emitted from the laser from response radiation emitted by the imaging plate.

9. The system of claim 8, further comprising:
a photodetector, wherein the dichroic mirror directs the incident laser light towards the imaging plate and directs the response radiation towards the photodetector.

10. The system of claim 9, further comprising:
at least one red wavelength blocking filter positioned between the photodetector and the dichroic mirror.

11. The system of claim 1, wherein each of the first and second scanning heads is adapted to direct the laser beam to the surface of the imaging plate and direct response radiation emitted by the imaging plate toward a photodetector.

12. The system of claim 1, wherein each of the first and second scanning heads comprise:
a focusing lens for focusing incident laser light on the imaging plate.

13. The system of claim 12, wherein the focusing lens focuses a laser beam to a diameter of 25 to 250 microns.

14. The system of claim 12, wherein the focusing lens focuses a laser beam to a diameter of 50 to 80 microns.

15. The system of claim 1, further comprising:
a guide rail running parallel to the straight path across the imaging plate, wherein the guide rail restricts the movement of each of the first and second scanning heads to move in the straight path across the imaging plate collinear with the laser beam path when passing across the surface of the imaging plate.

16. The system of claim 1, further comprising:
a transport mechanism adapted to move the imaging plate in a direction perpendicular to the straight path across the imaging plate.

17. A system for scanning an imaging plate, comprising:
a continuous belt drive;
a plurality of scanning heads mounted to the belt drive; and
a laser positioned to direct a laser beam in a beam path across the imaging plate, wherein the continuous belt drive is positioned to sequentially move each of the plurality of scanning heads in a path collinear with the laser beam path when moving across the imaging plate.

18. The system of claim 17, wherein, the plurality of scanning heads are mounted equidistantly around the belt drive.

19. A method of scanning an imaging plate, comprising:
directing a laser beam in a beam path across the surface of the imaging plate; and
alternatingly moving first and second scanning heads across the surface of the imaging plate in a path collinear with the beam path wherein only one of the first and second scanning heads is positioned collinear with the beam path at a time.

20. The method of claim 19, wherein the imaging plate is a phosphor screen.

21. The method of claim 19, wherein, the first and second scanning heads are mounted at equidistant locations around a continuous belt drive wrapped around at least two pulleys.

22. The method of claim 21, further comprising:
rotating the at least two pulleys to drive the continuous belt drive.

23. The method of claim 19, further comprising:
reflecting the laser beam onto the surface of the imaging plate with a mirror disposed in each of the first and second scanning heads.

24. The method of claim 19, further comprising:
directing response radiation emitted by the imaging plate towards a photodetector.

25. The method of claim 24, wherein directing response radiation emitted by the imaging plate towards a photodetector comprises:
separating the incident laser light from the response radiation with a dichroic mirror.

26. The method of claim 25, wherein a dichroic mirror is disposed in each of the first and second scanning heads.

27. The method of claim 25, wherein a dichroic mirror is disposed adjacent the laser.

28. The method of claim 23, further comprising:
blocking red wavelength light with a blocking filter positioned between the photodetector and the dichroic mirror.

29. The method of claim 17, further comprising:
positioning a guide rail parallel to the path of the laser beam such that the guide rail restrains the movement of the first and second scanning heads to movement collinear with the laser beam path as the scanning heads move across the surface of the imaging plate.

30. The method of claim 17, further comprising:
advancing the imaging plate in a direction perpendicular to the beam path.

31. A method of scanning an imaging plate, comprising:
directing a laser beam in a beam path across the surface of the imaging plate; and
alternatingly moving as plurality of scanning heads across the surface of the imaging plate in a path collinear with the beam path where in only one of the plurality of scanning heads is positioned collinear with the beam path at a time.

32. The method of claim 31, where in, the plurality of scanning heads are mounted at equidistant locations around a continuous belt drive wrapped around at least two pulleys.

33. The method of claim 31, further comprising:
positioning a guide rail parallel to the path of the laser beam such that the guide rail restrains the movement of the plurality of scanning heads to movement collinear with the laser beam path as the scanning heads move across the surface of the imaging plate.

* * * * *